United States Patent
Michel et al.

(10) Patent No.: US 7,738,926 B2
(45) Date of Patent: Jun. 15, 2010

(54) METHOD AND DEVICE FOR WIRELESS CONTROLLED ACCESS TO TELEMATIC AND VOICE SERVICES

(75) Inventors: Philippe Michel, Caen (FR); Francois Marie, Valognes (FR); Bernard Courtemanche, Caen (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 11/165,935

(22) Filed: Jun. 24, 2005

(65) Prior Publication Data
US 2006/0007920 A1    Jan. 12, 2006

(30) Foreign Application Priority Data
Jun. 24, 2004    (FR)    ................................... 04 06922

(51) Int. Cl.
*H04M 1/00*    (2006.01)

(52) U.S. Cl. ................... 455/569.2; 455/410; 455/41.2; 455/557; 455/556.1; 455/426.1; 670/338; 670/352

(58) Field of Classification Search ......... 455/410–411, 455/41.1–41.3, 575.9, 558, 569.2, 426.1; 713/168; 380/247; 370/346, 350, 352, 338
See application file for complete search history.

(56) References Cited

U.S. PATENT DOCUMENTS

| | | | | | |
|---|---|---|---|---|---|
| 5,359,323 | A | * | 10/1994 | Michel | 340/10.1 |
| 5,682,379 | A | * | 10/1997 | Mahany et al. | 370/311 |
| 6,331,972 | B1 | * | 12/2001 | Harris et al. | 370/313 |
| 6,748,244 | B2 | * | 6/2004 | Odinak | 455/569.2 |
| 6,879,810 | B2 | * | 4/2005 | Bouet | 455/41.2 |
| 6,885,860 | B2 | * | 4/2005 | Bahl et al. | 455/414.1 |
| 6,973,333 | B1 | * | 12/2005 | O'Neil | 455/569.2 |
| 6,996,397 | B2 | * | 2/2006 | Fraser et al. | 455/426.1 |
| 7,076,210 | B2 | * | 7/2006 | Sasai et al. | 455/41.2 |
| 7,130,614 | B2 | * | 10/2006 | Sreemanthula et al. | 455/411 |
| 7,177,594 | B2 | * | 2/2007 | Burr | 455/41.2 |
| 7,203,482 | B2 | * | 4/2007 | Blumenthal et al. | 455/411 |

(Continued)

FOREIGN PATENT DOCUMENTS

WO    WO 2004/036856    4/2004

OTHER PUBLICATIONS

Bluetooth SIG, "SIM Access Profile, Interoperability Specification" Online!; Jun. 6, 2002; pp. 1-50; XP-002314566.

(Continued)

*Primary Examiner*—Sharad Rampuria
(74) *Attorney, Agent, or Firm*—Fish & Richardson P.C.

(57) ABSTRACT

In a method for accessing voice or data services via a mobile telephony network, a communication device provided with wireless communication means detects within radio range communication terminals equipped with authentication means to connect to a mobile telephone network, selects a communication terminal to be used for accessing the network, by polling the terminal owner, sets up a wireless communication with the selected communication terminal, uses the latter's authentication means to set up a connection with the network, determines by polling the user of the communication terminal whether a terminal is authorized to access the voice or data services via the communication device and the connection it has set up with the network, and refuses access to the voice or data services if the terminal is not authorized.

9 Claims, 2 Drawing Sheets

U.S. PATENT DOCUMENTS

| | | | |
|---|---|---|---|
| 7,263,076 B1* | 8/2007 | Leibovitz et al. | 370/310 |
| 7,522,881 B2* | 4/2009 | Yamagiwa | 455/41.2 |
| 7,522,907 B2* | 4/2009 | Lupper et al. | 455/411 |
| 7,522,908 B2* | 4/2009 | Hrastar | 455/411 |
| 7,596,391 B2* | 9/2009 | Himmelstein | 455/569.2 |
| 2002/0082002 A1* | 6/2002 | Fujii | 455/419 |
| 2003/0118015 A1* | 6/2003 | Gunnarsson et al. | 370/389 |
| 2003/0224840 A1* | 12/2003 | Frank et al. | 455/575.9 |
| 2004/0077336 A1* | 4/2004 | Lauriol | 455/411 |
| 2005/0266798 A1* | 12/2005 | Moloney et al. | 455/41.2 |
| 2005/0266826 A1* | 12/2005 | Vlad | 455/410 |

OTHER PUBLICATIONS

Bluetooth Specification, "Specification of the Bluetooth System, Profiles, Version 1.0 B, Service Discovery Application Profile" Dec. 1, 1999; XP-002176976.

* cited by examiner

METHOD AND DEVICE FOR WIRELESS CONTROLLED ACCESS TO TELEMATIC AND VOICE SERVICES

FIELD OF THE INVENTION

The present invention pertains to the management of access to data and voice services.

It applies in particular, but not exclusively to the access to said services via a mobile telephony network such as GSM/GPRS (Global System for Mobile Communications/General Packet Radio Service).

BACKGROUND OF THE INVENTION

In the area of motor vehicles, in-car communication devices are known, commonly called "car kits" offering a "hands free" function making it possible to dial and telephone without having to manipulate the mobile telephone. These devices generally operate when coupled to a mobile telephone which for this purpose is placed in a support called "cradle" or "base unit". Some of these devices may also integrate a mobile telephone.

These devices may be divided into two categories. In the first category the device consists of an in-car computer able to manage a mobile telephone, loud speakers, a microphone and other vehicle equipment. Devices in this category are rather more intended for the public at large since they are designed to be connected to the user's usual mobile telephone. Once the telephone is placed on the base unit of the device, the user can activate the "hands free" function of the device which integrates voice recognition functions able to recognize some words such as "telephone" uttered by the user and captured by the microphone of the device. In this category, the user's mobile telephone is always used to access an external telephony network. The devices which come under this category therefore have the advantage of not being equipped with telecommunications equipment.

If the mobile telephone is equipped with a SIM card (Subscriber Identity Module), the user has to enter a personal "PIN" code which is verified by the SIM card. If the correct code is entered, the user is able to access the telephony network.

In the second category, the device also consists of an in-car computer, but has its own telephone equipment comprising a modem linked to an external antenna. The telephone equipment must be equipped with a SIM card and hence its owner must hold a specific telephone subscription. The devices in this category are therefore rather more intended for professional use. In addition, they have the added benefit of an external antenna offering better gain than the antenna of a mobile telephone.

Also, some of these devices use what is called a "Bluetooth profile" called "SIM Access Profile" (SAP) grouping together a set of functions offering users the possibility to use the SIM card of their mobile telephone without having to place the telephone in the base unit of the device. With this Bluetooth profile it is possible to separate the telephone equipment from the SIM card which may be in the mobile telephone or in a card reader of the device, the link between the telephone equipment and the SIM card being ensured by a Bluetooth link. In this second category, this operating function avoids the use of a specific SIM card while using the external antenna with which the vehicle is equipped.

Some communication devices (car kits) also enable PC-type equipment (or personal digital assistant) provided with communication means of Bluetooth type to be placed in communication with voice or data services accessible via the mobile network, the payment of these services being made by the holder of the SIM card inserted in the communication device or in communication therewith via SAP.

The functioning of this kind of device is illustrated in FIG. 2. On activating the communication device, for example when inserting the vehicle's ignition key, the device executes procedure 20 shown in this figure. During the first step 21 of this procedure, the communication device scans the radio environment to detect equipment equipped with a Bluetooth interface. In the following step 22, if no equipment is detected, the device returns to the previous step optionally passing through an intermediate standby step 23. If one or more items of equipment are detected, and if such items include one or more mobile telephones, one is chosen at random giving preference to a mobile telephone with which it has already been connected.

If during step 24, the chosen telephone is being connected for the first time to the device, this device carries out Bluetooth pairing procedure (step 25). This procedure uses a telephone authentication mechanism based on entry by the user of a common secret code called Bluetooth PIN code shared by the telephone and the device. If pairing procedure is successful, a Bluetooth connection is set up between the device and the telephone. If at step 24 for the chosen telephone this is not a first-time connection, an automatic authentication mechanism (no user action) based on the use of a session key obtained during the previous session is used before setting up the connection.

If telephone authentication is successful (step 26), the communication device sets up a connection with the mobile telephony network using the SIM card of this telephone. Subsequently, other equipment such as equipment of PC or PDA type can be connected to the device via a Bluetooth or wire link to use the connection that has been set up with the telephony network in order to access voice or information services offered by the telephony network, these services then being invoiced to the owner-user of the telephone paired with the communication device.

Should the communication device detect several mobile telephones equipped with a SAP profile, it chooses at random the first telephone recognized, which raises a problem since the user chosen by the device is not necessarily the person wishing to pay for access to the services. In other words, it is not possible to choose which mobile telephone must be paired with the device. It is also not possible to refuse access by one or more items of equipment of PC or PDA type to the data or voice services once the connection with the telephony network has been set up.

In addition, if the security of the telephone chosen by the communication device has been disabled, the owner of the mobile telephone may not be informed that it is he/she who will pay for access to the services offered by the network.

At the current time, Bluetooth protection between the communication device and equipment of PC or PDA type is rarely enabled or used efficiently. The Bluetooth PIN code of the communication device is often chosen in simplistic fashion, e.g. "1234" for easy memorizing. There is therefore a high risk that an unwanted person may access the network services by passing through the communication device unknown to its owner, and therefore of making the latter pay for this access. In addition, if the fraudulent person has managed to connect once, there is no further need to enter the Bluetooth PIN code for any subsequent times since his equipment has been memorized as already having been connected.

SUMMARY OF THE INVENTION

The present invention sets out to overcome these drawbacks. This objective is achieved by providing a management method for access to data or voice services via a mobile telephony network, which comprises the steps during which:

a communication device provided with wireless communication means detects within radio range communication terminals equipped with authentication means to connect to a mobile telephony network, the communication device sets up a wireless communication with a communication terminal and uses authentication means of the communication terminal to set up a connection with the mobile telephony network, and at least one terminal accesses voice or data services via the communication device and the connection set up by the latter with the mobile telephony network.

According to the invention, this method also comprises the steps during which:

the communication device selects a communication terminal to be used to access the mobile telephony network, by polling the user of the selected communication terminal, and the communication device determines, by polling the user of the selected communication terminal, whether the terminal is authorized to access voice or data services, and refuses access to the voice or data services if the terminal is not so authorized.

According to one preferred embodiment of the invention, the communication device provides a list of identifiers of the terminals detected within radio range, indicating which terminals are equipped with authentication means to connect to the mobile telephony network, to allow the user to select a terminal whose authentication means are to be used to connect to the mobile telephony network.

Advantageously, the list of identifiers of those terminals detected within radio range is used to allow the user of the communication terminal being used for accessing the mobile telephony network to choose at least one terminal authorized to access the voice or data services via the connection set up with the mobile telephony network.

According to another preferred embodiment of the invention, several terminals simultaneously access voice or data services via a hub provided in the communication device and via the connection set up by the latter with the mobile telephony network.

According to another preferred embodiment of the invention, the connection between the communication device and the mobile telephony network is maintained for as long as a wireless communication is set up between the communication terminal and the communication device.

According to a further preferred embodiment of the invention, this method also comprises a pairing step that is performed if the communication terminal has never been paired with the communication device, and an automatic authentication step using a session number obtained during a previous connection, if the communication terminal has already been paired with the communication device.

The invention also concerns a communication device to manage access to voice or data services via a mobile telephony network, the communication device comprising:

wireless communication means associated with means for detecting within radio range communication terminals equipped with authentication means for connecting to a mobile telephony network, means for setting up a wireless communication with a communication terminal, means for setting up a connection with the mobile telephony network using the authentication means of the communication terminal with which a wireless connection has been set up, and means for simultaneously setting up a wireless communication with a terminal in order to allow its access to voice or data services via the connection set up with the mobile telephony network.

According to the invention, this communication device also comprises:

means for determining which communication terminal is to be used for accessing a mobile telephony network, by polling the user of the communication terminal being used to access the mobile telephony network, and means for determining, by polling the user of the communication terminal, whether the terminal is authorized to access the voice or data services, and to refuse access to the voice or data services if the terminal has no authorization.

According to a preferred embodiment of the invention, this communication device also comprises a hub to set up a communication simultaneously with several terminals in order to allow them access to voice or data services via the connection set up with the mobile telephony network.

According to a preferred embodiment of the invention, this communication device also comprises a display which displays the list of terminals detected within radio range and means for determining whether each detected terminal is equipped with authentication means to access the mobile telephony network.

The invention also concerns a computer program able to be performed by a communication device provided with wireless communication means and with means for connecting to a mobile telephony network, this program using the above-defined method.

BRIEF DESCRIPTION OF THE DRAWINGS

A preferred embodiment of the invention is described below as a non-limitative example with reference to the appended drawings in which.

DETAILED DESCRIPTION OF PREFERRED EMBODIMENTS

Figure 1:
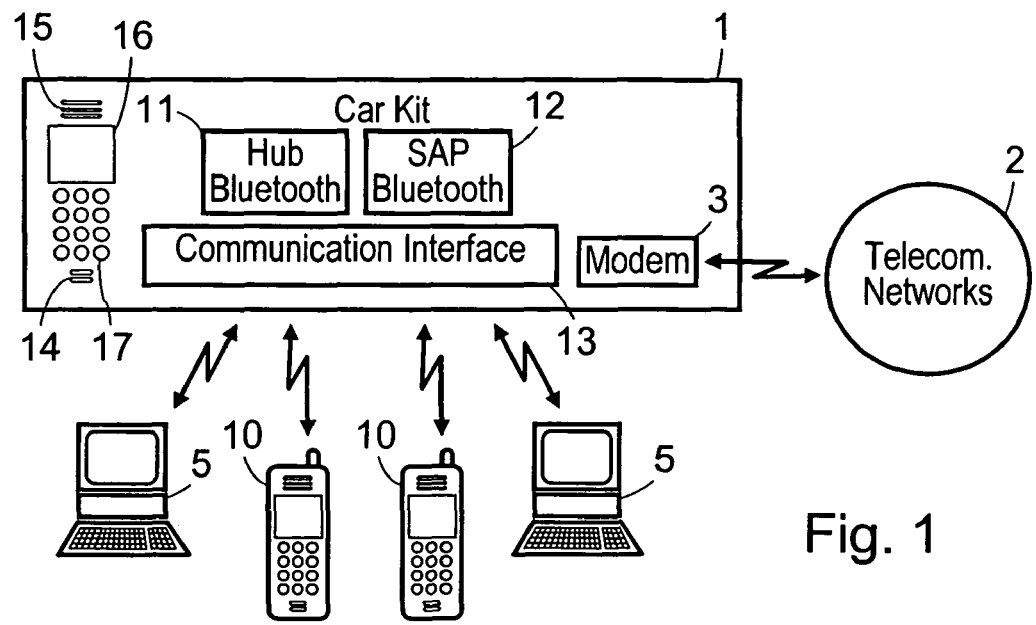
FIG. 1 shows an access system to voice and data services which includes the device of the invention, FIG. 2 gives a flow chart of a prior art access system to voice and data services.
Figure 2:
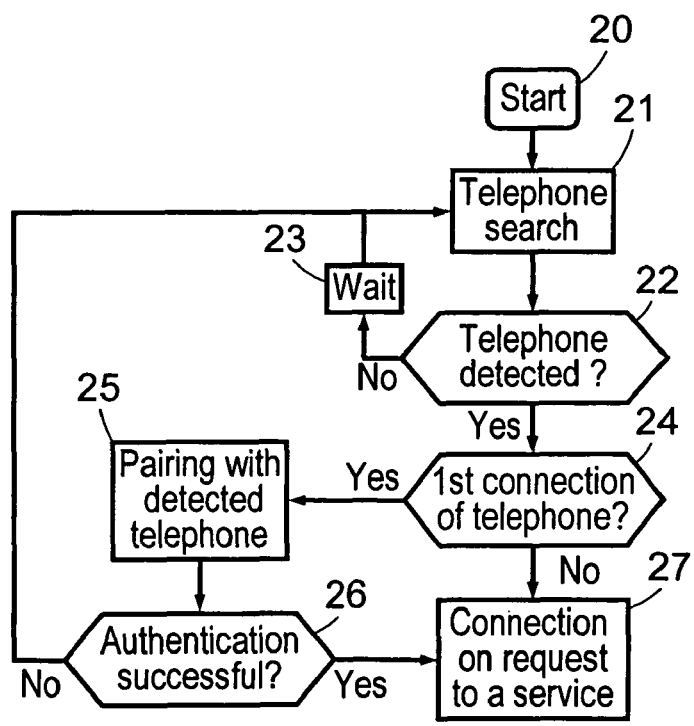

FIG. 1 shows a management system for access to voice and/or data services via a mobile telecommunications network 2, of GSM/GPRS type for example.

This system comprises a communication device 1 or "car kit" intended to be installed on board a vehicle for example. This device comprises a modem 3 enabling communication with the telecommunications network 2, and a wireless communication interface 13 of Bluetooth type for example, allowing a communication to be set up with a terminal 5, 10 equipped with a similar interface.

The communication device 1 also comprises a module 12 consisting, as regards Bluetooth, of a Bluetooth radio profile called SAP (SIM Access Profile) allowing access in particular to the SIM card of a mobile terminal 10 with which a wireless communication link is set up to access the telecommunications network 2.

The communication device 1 also comprises a voice interface 14, 15 enabling the user to give voice commands and to receive voice messages from the device. Alternatively or in combination, the communication device may also comprise a display 16 and a command keypad 17.

According to the invention, the wireless communication device 1 also comprises a hub 11 enabling several wireless links to be set up simultaneously with terminals 5 located in the vicinity, so as to allow them to communicate with the telecommunication network 2 via the modem 3 and the communication interface 13.

This system is especially designed to manage control over access to paying voice or data services accessible by the telecommunications network 2 via the communication interface 13.

Figure 3:
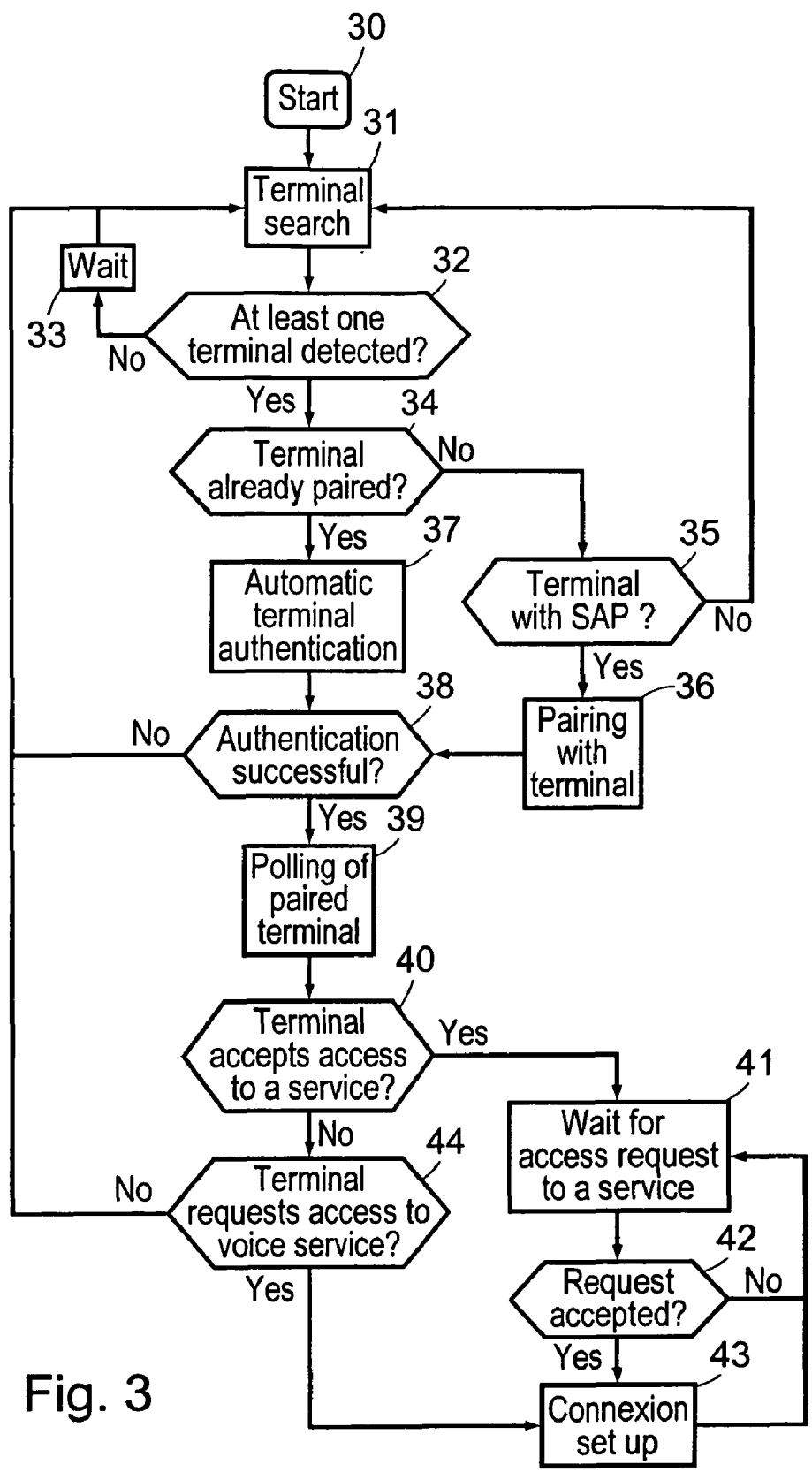
FIG. 3 is a flow chart of the access system of the invention to voice and data services.

According to the invention, to manage the control of access to such services, the communication device 1 performs procedure 30 illustrated FIG. 3. In this figure the communication device, which is therefore not connected to network 2, permanently scans to determine whether terminals 5, 10 equipped with a wireless communication interface are within communication range (step 31). For this purpose, under the Bluetooth standard, it periodically sends a search message and possibly recovers the identifiers of terminals answering the search message.

During step 32, the communication device receives any reply messages containing a terminal identifier and in some cases the type of terminal. Terminal type is always given if it is a mobile telephone (integrating a SIM card).

If during step 32 the communication device does not detect the presence of a terminal of the type having a SIM card, it places itself in standby for a pre-determined time interval or subsequent to a command to this effect triggered by the user (step 33), before returning to step 31 to emit a new search message.

During the standby phase, a terminal arriving within radio range of the communication device may also send out a message to signal its presence. In this case, this message is received and analysed by the communication device which carries out the procedure starting from step 34 described below.

If at step 32 a detected terminal 10 has a SIM card, the communication device moves onto the next step 34 during which it determines whether the detected terminal has already been paired using a memorized list of already paired terminals. If the terminal has never been paired, during step 35 it sends it a message asking whether it is equipped with a SAP profile. If the terminal's reply indicates that it is equipped with a SAP profile, the device executes a pairing step 36 with the terminal using an authentication mechanism of the terminal's owner entailing entry by the user of the Bluetooth PIN code. Device 1 then stores in memory a session key calculated using the PIN code entered by the terminal owner, for the setting up of a subsequent connection. With each new authentication a new session key is generated from the previous one and memorized in its place.

On completion of the pairing/authentication procedure, the terminal owner may be invited to enter the PIN code of the SIM card if this security is enabled.

If at step 34 the detected terminal has already been paired, the device carries out automatic authentication procedure 37 that does not have recourse to the terminal user, based on use of the session key obtained during a previous connection, and after which the terminal is given a new session key by the device for a subsequent connection.

If at the following step 38, the terminal authentication conducted at step 36 or 37 is successful, the communication device moves onto step 39 during which either vocally or via display 16 it polls the owner of the authenticated terminal to enquire whether he accepts to pay for access to the paying data services. This polling message is displayed or reproduced vocally by the device. The communication device then places itself in standby for a reply message which may be given vocally or using a command button 17 provided for this purpose (step 40). If device 1 does not receive any reply with a certain time interval, it resumes the terminal search phase starting from step 31. If the device receives a negative reply, it similarly polls the owner of the authenticated terminal to ask whether he wishes to access the "voice" service of network 2, to benefit from the vehicle's external antenna (step 44). If the owner's reply is negative or if no reply is received within a certain time limit, it resumes the terminal search phase starting from step 31. If positive, the communication device sets up a connection with the "voice" service of network 2 (step 43).

If at step 40 the owner agrees to his SIM card being used to access paying services, device 1 seeks to detect in its environment whether terminals 5 (of PC, PDA type, . . . ) compatible with the data services are attempting to access voice or data services (step 41). If this is the case, it polls the owner of terminal 10 (by voice or display) who accepted use of his SIM card to access paying services, to determine whether he agrees for detected terminal 5 of PC type to access said service (step 42). If the owner's reply is positive, the device sets up the connection with network 2 (step 43), if not access to the service is refused. In both these cases, device 1 resumes the procedure at step 41 to search for other terminals 5 wishing to access a paying data service offered by network 2.

By means of the hub 11, several terminals 5 may hence access simultaneously the voice or data services offered by network 2.

The connection with the telecommunications network 2 is made by using the SIM card of terminal 10 whose owner accepted access via the SAP profile 12. The connection with network 2 is therefore set up by device 1 as if the terminal concerned is the one integrating the SIM card used.

If terminal 10 used to set up a connection of the communication device 1 with the network 2 interrupts the wireless link with the device 1 (closing of Bluetooth session), device 1 interrupts the connection with network 2 which closes access in progress by the connected terminals 5 to the services.

In a variant of the invention, during the Bluetooth environment scanning phase, all the detected terminals 5, 10 are presented on the display 16 in a list specifying for each terminal whether the terminal has a SIM card and whether it has already been paired with the communication device 1. The user is then invited to choose from the displayed list which terminal 10 is to be used to access network 2 and the terminal or terminals 5 subsequently authorized to access the paying voice or data services via the hub 11 and modem 3.

At the same time, the communication device 1 continues scanning its radio environment to detect the possible presence of other terminals 5 in order to complete the list and to offer the user the possibility of accepting the connection of these other terminals.

Obviously, other wireless communication means (short range) may be considered without departing from the scope of the present invention. For example the Bluetooth protocol may be replaced by other protocols such as WiFi.

The invention claimed is:

1. A method for managing access to voice or data services via a mobile telephony network, comprising the steps during which:
   a communication device provided with a modem to access said mobile telephony network and with wireless communication means to scan a radio environment to communicate, within radio range, with mobile devices equipped with similar wireless communications means;
   the communication device sets up a first wireless connection with a first mobile device that is equipped with authentication means to connect to said mobile telephony network;
   the communication device sets up a second wireless connection with a second mobile device, distinct from the first mobile device, that is attempting to access voice or data services;
   the communication device asks a user of the first mobile device whether the user agrees for the second mobile device to access said voice or data services by using the authentication means of the first mobile device;
   if the user agrees, the communication device using said modem and the authentication means of the first mobile device though said first wireless connection, sets up a third wireless connection to the mobile telephony network to enable the second mobile device to access said voice or data services though said second and third connections; and
   if the user does not agree, the communication device refuses access to said voice or data services to the second mobile device.

2. The method of claim 1, wherein the list of identifiers of mobile devices detected within radio range is used to allow the user of the mobile device being used to access the mobile telephony network to select at least one mobile device authorized to access the voice or data services though the connection set up with the mobile telephony network.

3. The method of claim 1, wherein several mobile devices simultaneously access voice or data services via a hub provided in the communication device and via the third connection.

4. The method of claim 1, wherein the third connection between the communication device and the mobile telephony network is maintained for as long as the first connection is maintained between the first mobile device and the communication device.

5. The method of claim 1, further comprising a pairing step conducted if the first mobile device has never been paired with the communication device, and an automatic authentication step using a session number obtained during a previous connection if the first mobile device has already been paired with the communication device.

6. A communication device to manage access to voice or data services via a mobile telephony network, the communication device comprising:
   wireless communications means to scan a radio environment to communicate with, within radio range, mobile devices equipped with similar wireless communications means;
   modem means to access said mobile telephony network;
   means to set up a first wireless connection with a first mobile device that is equipped with authentication means to connect to said mobile telephony network;
   means to set up a second wireless connection with a second mobile device, distinct from the first mobile device, the second mobile device attempting to access voice or data services, and to ask a user of the first mobile device whether the user agrees for the second mobile device to access said voice or data services by using the authentication means of the first mobile device;
   means for determining if the user agrees, and if the user agrees, using the modem means and the authentication means of the first mobile device to set up a third wireless connection to the mobile telephony network and the second mobile device to enable the second mobile device to access the voice and data services though the second and third wireless connections, and if the user does not agree, refusing to provide access to the voice and data services to the second mobile device.

7. The device of claim 6, further comprising a hub to set up a communication with several mobile devices simultaneously to allow them access to voice or data services via the third connection.

8. The device of claim 6, further comprising a display to display a list of mobile devices detected within radio range, and means for determining for each detected mobile device whether it is equipped with authentication means to access the mobile telephony network.

9. The method of claim 1 wherein the communication device displays a list of identifiers of communication devices within radio range, indicating which devices are equipped with authentication means to connect to the mobile telephony network to enable a user to select from the list of identifiers a communication device whose authentication means are to be used to connect to the mobile telephony network.

* * * * *